United States Patent
Song et al.

(10) Patent No.: US 12,457,399 B2
(45) Date of Patent: Oct. 28, 2025

(54) CAMERA MODULE ASSEMBLY

(71) Applicant: ASMPT Singapore Pte. Ltd., Singapore (SG)

(72) Inventors: Keng Yew Song, Singapore (SG); Yue Zhang, Singapore (SG)

(73) Assignee: ASMPT SINGAPORE PTE. LTD., Singapore (SG)

( * ) Notice: Subject to any disclaimer, the term of this patent is extended or adjusted under 35 U.S.C. 154(b) by 72 days.

(21) Appl. No.: 18/103,539

(22) Filed: Jan. 31, 2023

(65) Prior Publication Data
US 2024/0259661 A1    Aug. 1, 2024

(51) Int. Cl.
*H04N 23/55* (2023.01)
*H04N 23/54* (2023.01)

(52) U.S. Cl.
CPC ............ *H04N 23/55* (2023.01); *H04N 23/54* (2023.01)

(58) Field of Classification Search
CPC .............................. H04N 23/54; H04N 23/55
USPC ....................................................... 348/374
See application file for complete search history.

(56) References Cited

U.S. PATENT DOCUMENTS

| | | | |
|---|---|---|---|
| 10,946,812 B2 | 3/2021 | Devota et al. | |
| 2009/0140146 A1* | 6/2009 | Sogawa | H01L 27/14618 53/405 |
| 2010/0232037 A1* | 9/2010 | Do | G02B 13/003 359/713 |
| 2019/0187389 A1* | 6/2019 | Yanagisawa | G02B 6/4206 |
| 2019/0320095 A1* | 10/2019 | Kim | H04N 23/55 |
| 2021/0029280 A1* | 1/2021 | Kim | G03B 17/12 |
| 2021/0173126 A1* | 6/2021 | Lee | H04M 1/0277 |
| 2021/0318507 A1* | 10/2021 | Oh | H04N 23/54 |
| 2023/0283871 A1* | 9/2023 | Matsumoto | H04N 23/51 348/374 |

FOREIGN PATENT DOCUMENTS

KR    2019-0138386 A  * 12/2019 ............ G03B 17/12

\* cited by examiner

*Primary Examiner* — Anthony J Daniels
(74) *Attorney, Agent, or Firm* — OSTROLENK FABER LLP

(57) ABSTRACT

A camera unit assembly which improves efficiency and quality of the soldering affixing lens holder and circuit board modules by providing partially occluded throughbores within a mounting part of the lens holder module, which can accommodate a solder ball, and into which soldering energy can be imparted allowing the solder ball to melt and at least partially flow from the bottom of the throughbore and onto a pad of the circuit board.

17 Claims, 4 Drawing Sheets

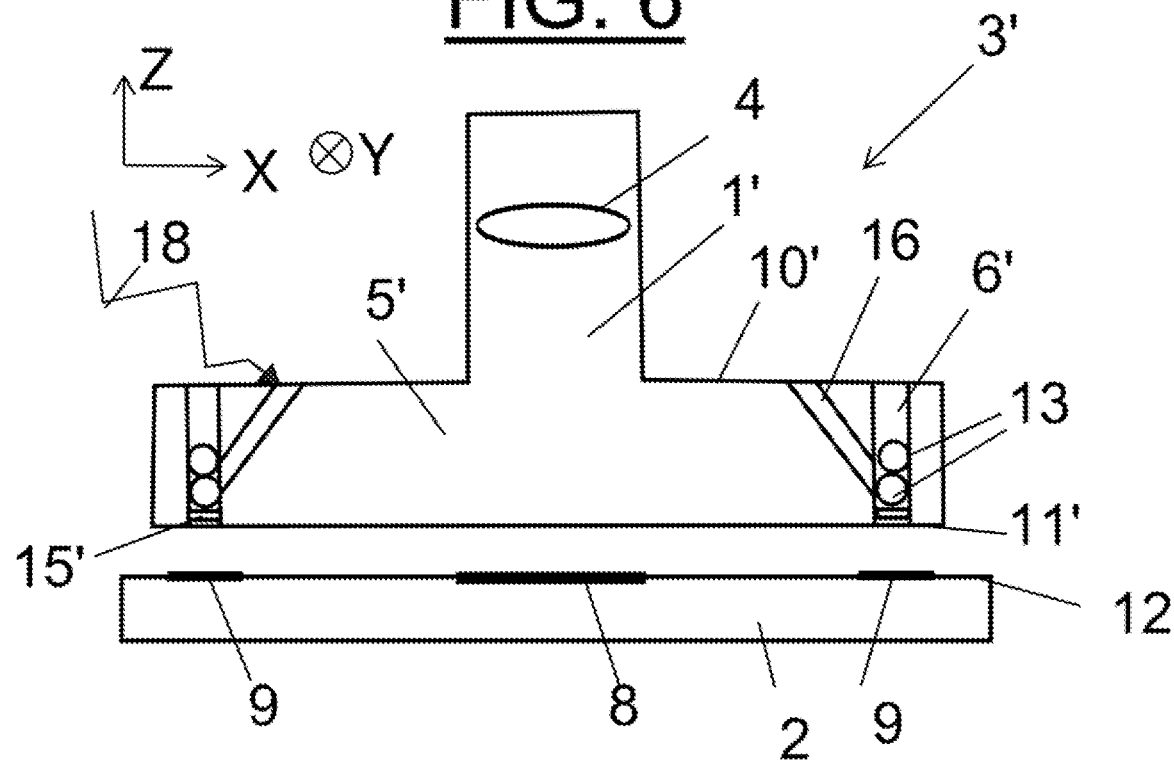
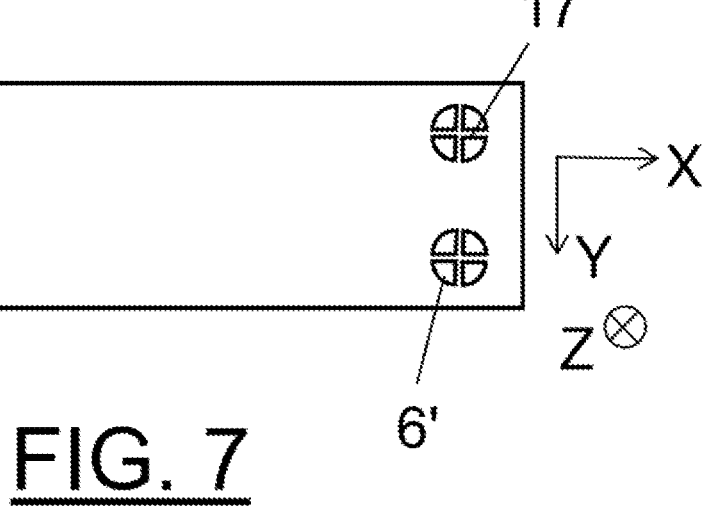

CAMERA MODULE ASSEMBLY

This invention relates to modules for assembling a camera unit, camera units and a method of assembling a camera unit.

BACKGROUND AND PRIOR ART

There is an increasing trend for automotive vehicles to be provided with camera units that obtain images from the exterior of the vehicle. Such camera units may conveniently be adhered to the windshield of a vehicle for example, pointing forward to obtain images from locations in advance of the vehicle. The basic components of such a camera unit are a camera lens, necessary for focusing the image, and an image sensor for receiving the image and outputting image data accordingly. The image data will require processing, which could be performed within the camera unit itself, or alternatively at a remote location, such as the vehicle's control system. To provide a high-quality image, it is essential that the camera lens and the image sensor are accurately aligned. To achieve this, the camera lens is typically held by a first module referred to as a "lens holder", while the image sensor is located on a second module in the form of a circuit board. These two modules may then be aligned before being assembled together. If processing means are provided in the camera unit, these may also be located on the circuit board, or on a separate module, for which accurate alignment is not so important. Typically, an active alignment ("AA") process is used to align the lens holder and circuit board modules, as is well-known in the art per se. When the modules are assembled together, it is important to preserve the alignment, to ensure that the assembly is robust, and also that the ensuing camera unit is as small as possible, to reduce visual obstruction to the vehicle driver's field of vision.

A camera unit assembled by aligning and affixing a lens holder module and circuit board module (referred to as an "imager circuit board") is known from U.S. Ser. No. 10/946,812B2 for example. In that system, the lens holder includes a lens holding portion and an attaching portion. The attaching portion includes pins that, when the attaching portion is located at the imager circuit board, are received at least partially through apertures of the imager circuit board. The pins are then soldered at the imager circuit board so as to attach the lens holder to the imager circuit board, with the soldering energy provided by laser. With the pins received at least partially through the apertures, the lens holder is laterally adjusted relative to the imager circuit board to form an aligned imager assembly. The imager assembly is attached at a camera housing, and a processing circuit board is accommodated at the camera housing and electrically connected to the image circuit board.

However, this approach has some drawbacks. For example:
  i) the volume in the aperture is limited by the pins, so there may be insufficient solder material to fill the gap between an imager circuit board and a lens holder. As a result, the well aligned AA result may not be adequately fixed;
  ii) the gap between an imager circuit board and a lens holder generally is very small, and therefore the soldering energy importing angle is limited; and
  iii) the pin must well-aligned with the apertures of the image circuit board and then inserted into the latter, which may limit operation space.

The present invention seeks to overcome these problems, and provide a camera unit assembly which improves efficiency and quality of the soldering affixing the lens holder and circuit board modules.

In accordance with the present invention this aim is achieved by providing partially occluded throughbores within a mounting part of the lens holder module, which can accommodate a solder ball, and into which soldering energy can be imparted allowing the solder ball to melt and at least partially flow from the bottom of the throughbore and onto a pad of the circuit board.

For purposes of clarity and consistency, the following terms as used throughout this text and the appended claims should be interpreted as follows:
  Solder ball—a discrete mass of solder which may be approximately spherical, but is not so limited and can encompass other discrete masses of solder material, including solder grains; and
  Throughbore—an aperture extending through a material block which is open at both ends.

SUMMARY OF THE INVENTION

In accordance with a first aspect of the present invention there are provided modules for assembling a camera unit, the modules comprising:
  a circuit board comprising:
    an image sensor, and
    a solder pad located on an upper surface of the circuit board, and
  a lens holder for holding a camera lens, the lens holder comprising a mounting flange with opposed upper and lower surfaces,
  the circuit board and lens holder configured so that when the lens holder and circuit board are assembled together to form the camera module, the lower surface of the lens holder rests adjacent the upper surface of the circuit board, and
  wherein the lens holder comprises a throughbore extending between the upper and lower surfaces of the mounting flange, the throughbore positioned to align with the solder pad when the circuit board and lens holder are assembled together, the throughbore being partially occluded at an occlusion location proximate the lower surface, such that the throughbore has a larger open area proximate the upper surface of the mounting flange than at the occlusion location.

In accordance with a second aspect of the present invention there is provided a camera unit comprising the modules of the first aspect.

In accordance with a third aspect of the present invention there is provided a camera unit comprising:
  a circuit board comprising:
    an image sensor, and
    a solder pad located on an upper surface of the circuit board, and
  a lens holder holding a camera lens, the lens holder comprising a mounting flange with opposed upper and lower surfaces,
  the circuit board and lens holder being assembled together with the lower surface of the lens holder adjacent the upper surface of the circuit board,
  wherein the mounting flange comprises a throughbore formed therein and extending between the upper and lower surfaces of the mounting flange in alignment with the solder pad, and a solder joint securing the circuit board to the lens holder, the solder joint formed on the solder pad and extending into the throughbore.

In accordance with a fourth aspect of the present invention there is provided a method of assembling a camera unit, the camera unit comprising:

a circuit board comprising an image sensor and a solder pad located on an upper surface of the circuit board, and a lens holder holding a camera lens, the lens holder comprising a mounting flange with opposed upper and lower surfaces and a throughbore extending between the upper and lower surfaces, the method comprising the steps of:
i) inserting a solder ball into the throughbore through the upper surface of the mounting flange;
ii) aligning the lens holder and circuit board within a plane parallel to the upper surface of the circuit board;
iii) bring the lower surface of the mounting flange and the upper surface of the circuit board together; and
iv) melting the solder ball so that solder at least partially flows out of the throughbore and onto the solder pad.

Other specific aspects and features of the present invention are set out in the accompanying claims.

BRIEF DESCRIPTION OF THE DRAWINGS

The invention will now be described with reference to the accompanying drawings (not to scale), in which:

FIG. 6 schematically shows, in a sectional side view, a lens holder module and a circuit board module of a camera unit according to a further embodiment of the present invention;

FIG. 7 schematically shows the lower surface of the lens holder module of FIG. 6 from below.

In all of these figures, orthogonal X, Y, Z axes are shown to more clearly explain the various views shown in the figures. The Z-axis is notionally a vertical axis, and the terms "upper" and "lower", and "above" and "below" as used herein refer to items at relatively greater or lower Z values respectively.

DETAILED DESCRIPTION OF THE PREFERRED EMBODIMENTS OF THE INVENTION

Figure 1:
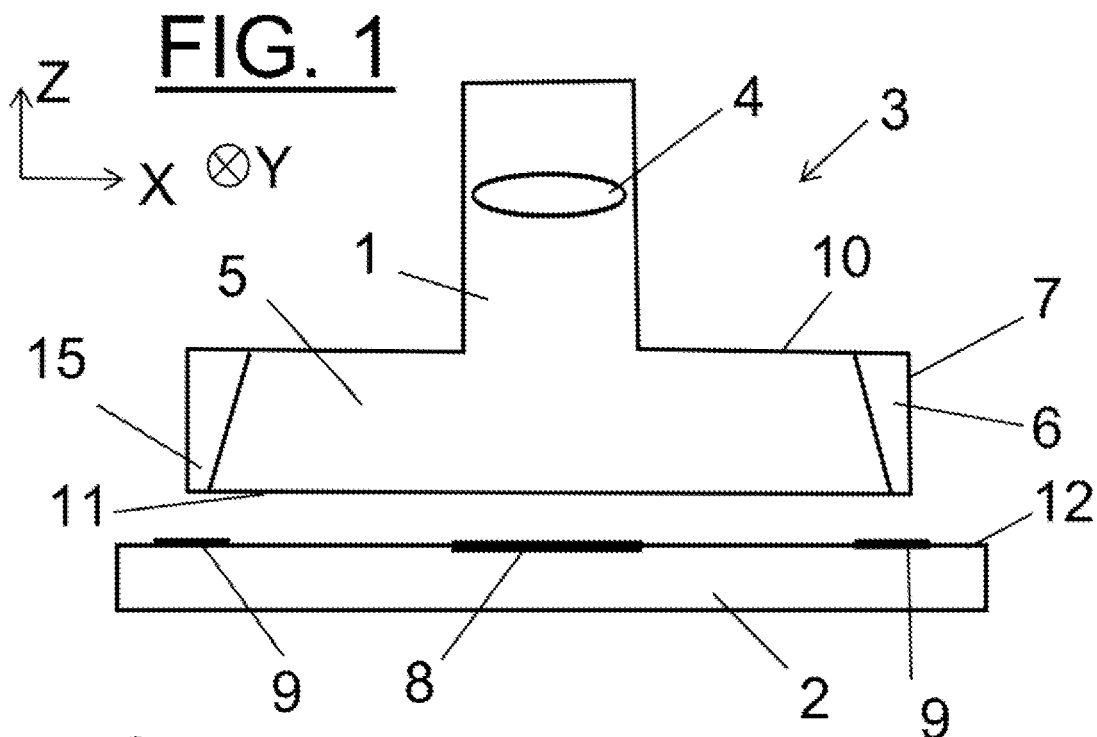
FIG. 1 schematically shows, in a sectional side view, a lens holder module and a circuit board module of a camera unit according to a first embodiment of the present invention.
Figure 2:
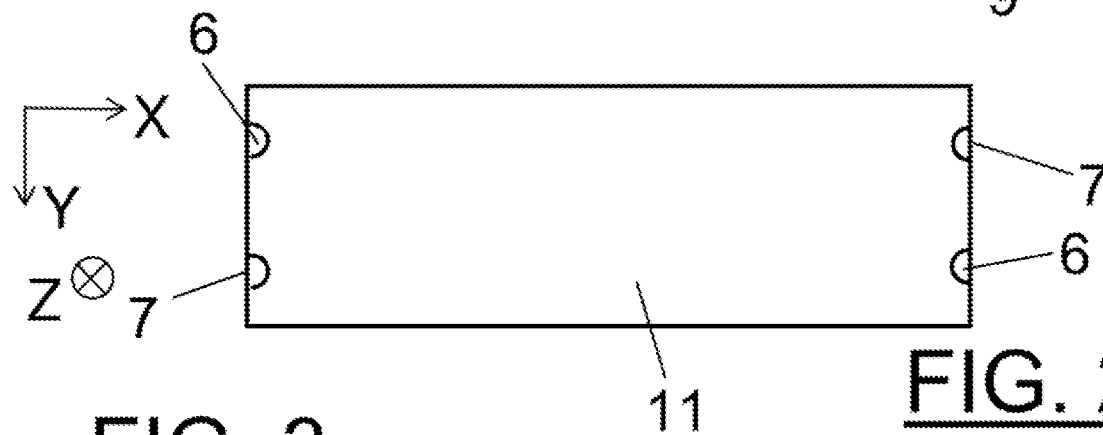
FIG. 2 schematically shows the lower surface of the lens holder module of FIG. 1 from below.
Figure 3:
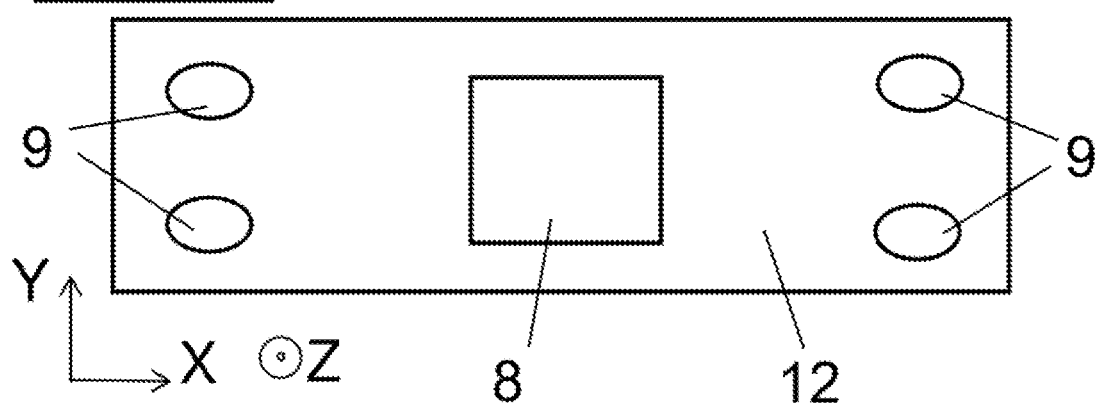
FIG. 3 schematically shows the upper surface of the circuit board module of FIG. 1 from above.

FIG. 1 schematically shows, in a sectional side view, a lens holder module 1 and a circuit board module 2 of a camera unit 3 according to a first embodiment of the present invention. FIG. 2 schematically shows the lower surface of the lens holder module 1 from below, while FIG. 3 schematically shows the upper surface of the circuit board module 2 from above. In these figures, the dimensions of the modules 1, 2 and their position in the X, Y Z space is kept constant for ease of reference.

The lens holder module 1 is adapted to retain a lens 4 of the camera, which is configured to focus incoming light rays onto an image sensor 8 of the circuit board module 2. In order to mount the lens holder module 1 to the circuit board module 2, a mounting flange 5 is provided having opposed upper and lower surfaces 10, 11. While the profile of both of the surfaces as shown as being substantially planar, only the lower surface 11 needs to be planar, since this lower surface 11 will rest adjacent an upper surface 12 of the circuit board module 2 when these are assembled together; the upper surface 10 could have any profile as required by the particular application. At least one throughbore 6, here four, extends between the upper and lower surfaces 10, 11, i.e. so that each throughbore 6 has an opening at each of the upper and lower surfaces 10, 11. In this embodiment, each throughbore 6 is located adjacent a side edge of the mounting flange 5, and this side of the throughbore 6 is closed off by respective optical windows 7, which are at least partially translucent to light energy. The optical windows 7 may comprise apertures, or an at least partially translucent material, such as glass or plastics material for example. In this case, a sheet of glass may be provided along the entire side edge of the mounting flange 5, thus closing off the sides of two adjacent throughbores (see FIG. 2). Each throughbore 6 is partially occluded at an occlusion location 15 proximate the lower surface 11, such that the throughbore 6 has a larger open area proximate the upper surface 10 of the mounting flange 5 than at the occlusion location 15. In this embodiment, each throughbore 6 tapers inwardly from the upper surface 10 of the mounting flange 5 towards the occlusion location 15—effectively therefore the opening of each throughbore 6 at the upper surface 10 is larger than the opening at the lower surface 11, so that the throughbores 6 form a funnel-shape.

The circuit board module 2 comprises a substantially planar circuit board with an image sensor 8 provided on its upper surface 12, arranged such that it may receive an image from lens 4 when the lens holder module 1 and circuit board module 2 are correctly assembled together. As is well-known in the art, the image sensor 8 may be located on the circuit board module 2 using a surface mount technology (SMT) process for example. Also provided on its upper surface 12 is at least one solder pad 9—here four solder pads 9 are provided, with one proximate each corner of the upper surface 12 (see FIG. 3). As is well-known in the art, solder pads 9 may be deposited using a solder printing process, typically before the placement stage of an SMT process. The solder pads 9 are positioned to directly underlie the openings of the throughbores 6 at the lower surface 11 of the mounting flange 5. As shown, each solder pad 9 has a larger area on the upper surface 12 of the circuit board than the area of the throughbore 6 at the lower surface 11 of the mounting flange 5. This is a benefit of the present invention, and enables the solder pads 9 to be provided with a plated or coated layer (not shown) with affinity for solder material placed thereon. However, there is no requirement for the solder pads 9 to be larger than the area of the overlying throughbore opening, and smaller solder pads 9 may be used if suitable for the particular application.

Although not shown in FIG. 1, the camera unit 3 may comprise additional modules also, for example an exterior housing, or additional circuit boards carrying components for image processing, communications, data storage etc. as the particular application requires.

Figure 4:
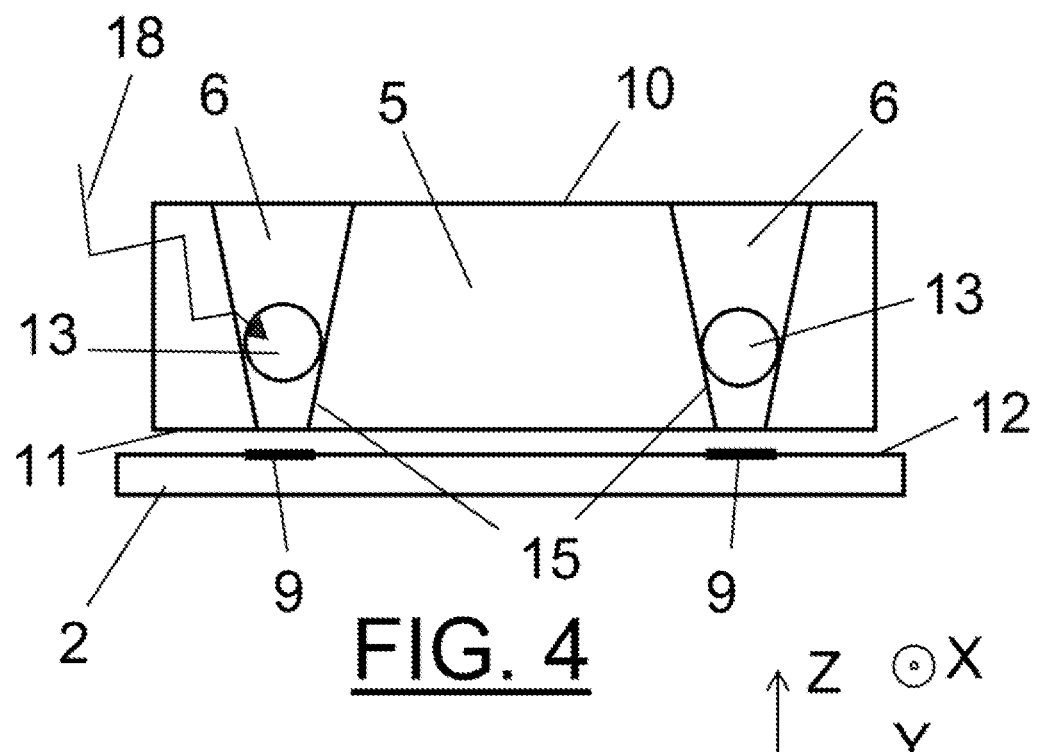
FIG. 4 schematically shows the lens holder module and circuit board module of FIG. 1 from the side, at the commencement of a soldering operation.

FIG. 4 schematically shows the lens holder module 1 and circuit board module 2 from the side (so looking into the throughbores 6 through their respective optical windows 7), at the commencement of a soldering operation. A solder ball 13 is inserted into each throughbore 6 through the opening at the upper surface 10 of the mounting flange 5. Each solder ball 13 is sized so that it has a smaller dimension than the throughbore 6 proximate the upper surface 10 of the mounting flange 5, but a larger dimension than the throughbore 6 at the occlusion location 15. This permits insertion of the solder ball 13 into the throughbore 6, but prevents it falling out of the bottom. Although not shown in FIG. 4, it may also be possible to insert more than one solder ball 13 into each throughbore as required. With the solder balls 13 inserted, the lens holder module 1 and circuit board module 2 may be aligned in the X-Y plane, parallel to the upper surface 12 of the circuit board. This can be achieved by using an active alignment process as is known in the art for example. The lower surface 11 of the mounting flange 5 and the upper surface 12 of the circuit board module 2 must also be brought together (i.e. in the Z direction) so that they are close enough to be soldered together. In fact, these three steps (i.e. insertion of the solder balls 13, X-Y alignment and bringing the surfaces 11 and 12 together) may be performed in any order. Once these have been completed, a soldering operation may be performed by heating and thus melting the solder balls 13. In this embodiment, this is achieved by applying laser energy 18 to the solder balls 13 through the adjacent optical windows 7.

Figure 5:
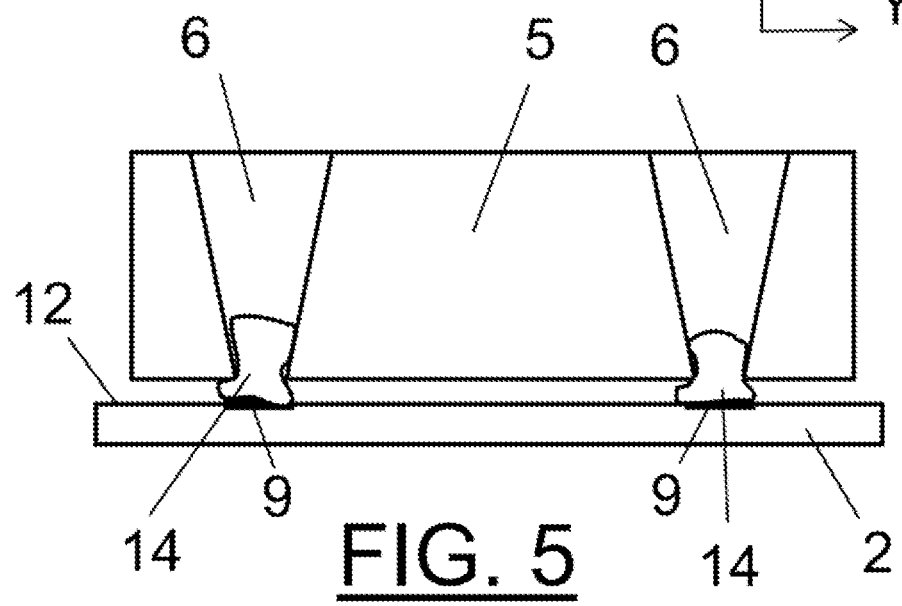
FIG. 5 schematically shows the lens holder module and circuit board module of FIG. 1 from the side, following completion of the soldering operation.

FIG. 5 schematically shows the lens holder module 1 and circuit board module 2 following completion of the soldering operation and laser energy is turned off. It can be seen that the solder balls 13 have melted and partially flowed out through openings of the respective throughbores 6 on the lower surface 11 of the mounting flange 5, and onto the underlying solder pad 9, forming a solder mass 14 of plug-like form, with its upper side frustoconically shaped due to the containing funnel-like throughbore 6. This shaping is beneficial, and adds mechanical strength to the assembly.

FIG. 6 schematically shows, in a sectional side view, a lens holder module 1' and a circuit board module 2' of a camera unit 3' according to a further embodiment, while FIG. 7 schematically shows, from below, the lower surface of the lens holder module 1'. Items similar to those shown in previous figures have retained their reference numbers where possible.

In this embodiment, there are two main differences made to the lens holder module 1':

i) Firstly, here the throughbores 6' are not tapered, but cylindrical. The occlusion location 15' is formed by providing an internal barrier 17 proximate the opening of each throughbore at the lower surface 11' of the mounting flange 5'. As more clearly shown in FIG. 7, the internal barrier 17 is of cruciform shape, but other designs are equally possible. The barriers 17 again acts to prevent solder balls 13 from falling out from the throughbores 6'. Following a soldering operation, the resultant solder mass (not shown) would extend up into the respective throughbore 6' past, and thus encompassing or 'burying', the barrier 17, which firmly holds the assembled modules together.

ii) Secondly, here thermal energy is supplied to the solder balls 13 not via an optical window, but via a thermal bridge 16 provided proximate each throughbore 6'. Each thermal bridge 16 comprises a pathway of relatively high thermal conductivity, relative to the mounting flange 5', extending between the throughbore 6' and a surface of the lens holder module 1, in this case the upper surface 10' of the mounting flange 5'. The thermal bridge 16 could for example comprise a copper pathway embedded within the material of the lens holder module 1'. The solder balls 13 may be melted by applying thermal energy, for example via laser energy 18 as shown, to the distal end of the thermal bridge 16, which thermal energy is thermally conducted to the throughbore 6' and hence the solder balls 13 contained therein, causing them to melt.

It should be noted that the use of thermal bridges is not limited to the cylindrical form of throughbore 6' shown in FIGS. 6 and 7, but may equally be used with the tapered throughbore 6 shown in FIG. 1. Similarly, cylindrical throughbores 6' such as shown in FIGS. 6 and 7 may be provided with optical windows allowing laser energy to be transmitted therethrough to the retained solder balls 13.

Figure 8:
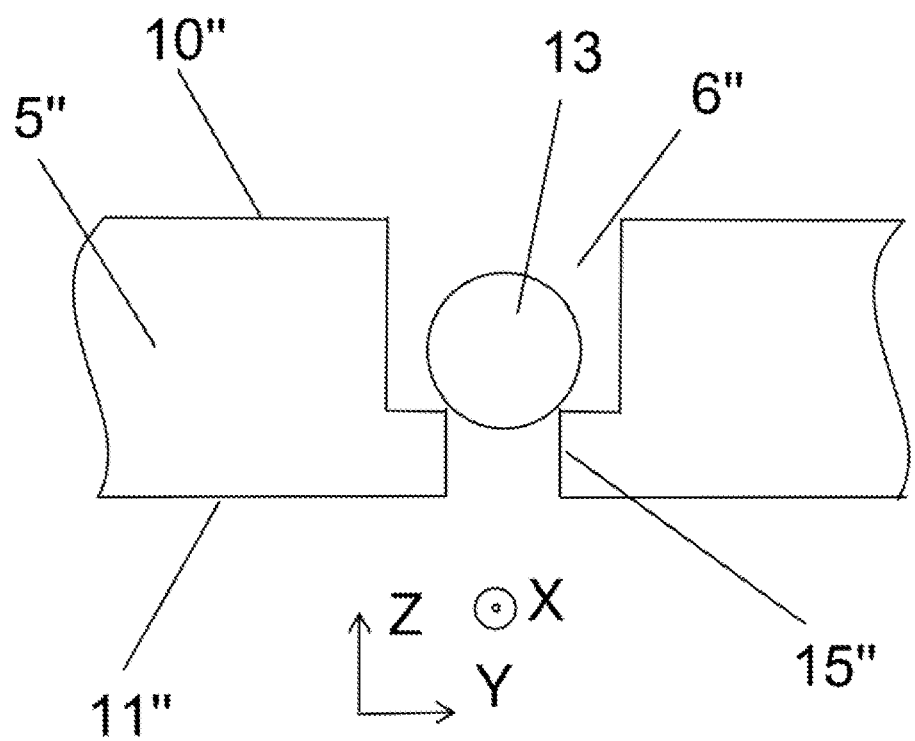
FIG. 8 schematically shows, in an enlarged sectional side view, part of a lens holder in accordance with another embodiment of the present invention.

FIG. 8 schematically shows, in an enlarged sectional side view, part of a lens holder in accordance with another embodiment of the present invention. This shows a yet further form of throughbore 6", with an occlusion location 15" provided by a step in the internal wall of the throughbore 6" proximate the lower surface 11" of the mounting flange 5". The step is essentially a form of internal barrier, similar in concept to that shown in FIGS. 6 and 7, but does not extend across the throughbore 6", and so may be simpler to fabricate.

The above-described embodiments are exemplary only, and other possibilities and alternatives within the scope of the invention will be apparent to those skilled in the art.

REFERENCE NUMERALS USED

1—Lens holder module
2—Circuit board module
3—Camera unit
4—Lens
5, 5', 5"—Mounting flange
6, 6', 6"—Throughbores
7—Optical windows
8—Image sensor
9—Solder pads
10, 10', 10"—Upper surface of mounting flange
11, 11', 11"—Lower surface of mounting flange
12—Upper surface of circuit board
13—Solder balls
14—Solder mass
15, 15'—Occlusion location
16—Thermal bridge
17—Barrier
18—Laser energy

The invention claimed is:
1. Modules for assembling a camera unit, the modules comprising:
　a circuit board comprising:
　　an image sensor, and
　　a solder pad located on an upper surface of the circuit board, and a lens holder for holding a camera lens, comprising a mounting flange with opposed upper and lower surfaces,
　　wherein the circuit board and lens holder are configured so that when the lens holder and circuit board are assembled together to form the camera module, a lower surface of the lens holder rests adjacent the upper surface of the circuit board, and wherein the lens holder comprises a throughbore extending between the upper and lower surfaces of the mounting flange, the throughbore positioned to align with the solder pad when the circuit board and lens holder are assembled together, the throughbore being partially occluded at an occlusion location proximate the lower surface of the mounting flange, such that the throughbore has a larger open area proximate the upper surface of the mounting flange than at the occlusion location, the occlusion location being configured to retain a solder ball, and wherein a side of the throughbore includes an optical window configured to allow laser energy to be applied to the solder ball retained within the throughbore via the optical window.

2. The modules of claim 1, wherein the throughbore tapers inwardly from the upper surface of the mounting flange towards the occlusion location.

3. The modules of claim 1, wherein the throughbore comprises an internal barrier at the occlusion location.

4. The modules of claim 1, wherein the mounting flange comprises an optical window provided at a side of the throughbore which is at least partially translucent to light energy.

5. The modules of claim 4, wherein the optical window comprises an aperture.

6. The modules of claim 4, wherein the optical window comprises an at least partially translucent material, optionally the optical window comprises glass.

7. The modules of claim 1, comprising a thermal bridge provided proximate the throughbore, the thermal bridge comprising a pathway of relatively high thermal conductivity, relative to the mounting flange, extending between the throughbore and a surface of the lens holder.

8. The modules of claim 1, wherein the solder pad has a larger area on the upper surface of the circuit board than the area of the throughbore at the lower surface of the mounting flange.

9. A camera unit comprising the modules of claim 1, wherein the lower surface of the mounting flange is affixed to the upper surface of the circuit board with solder extending between the solder pad and the interior of the throughbore.

10. A camera unit comprising:
a circuit board comprising:
an image sensor, and
a solder pad located on an upper surface of the circuit board, and
a lens holder holding a camera lens, the lens holder comprising a mounting flange with opposed upper and lower surfaces,
wherein the circuit board and lens holder are assembled together with a lower surface of the lens holder adjacent the upper surface of the circuit board,
wherein the mounting flange comprises a throughbore formed therein and extending between an open area proximate the upper surface and an occlusion location proximate the lower surface of the mounting flange in alignment with the solder pad, the occlusion location being configured to retain a solder ball,
wherein a side of the throughbore includes an optical window configured to allow laser energy to be applied to the solder ball retained within the throughbore via the optical window, and
a solder joint securing the circuit board to the lens holder, the solder joint formed on the solder pad and extending into the throughbore.

11. The camera unit of claim 10, wherein the throughbore is partially occluded at an occlusion location proximate the lower surface of the mounting flange, such that the throughbore has a larger open area proximate the upper surface of the mounting flange than at the occlusion location.

12. The camera unit of claim 11, wherein the solder extends into the throughbore at least to the occlusion location.

13. The camera unit of claim 10, wherein the mounting flange comprises an optical window provided at a side of the throughbore which is at least partially translucent to light energy.

14. A method of assembling a camera unit, the camera unit comprising:
a circuit board comprising an image sensor and a solder pad located on an upper surface of the circuit board, and
a lens holder holding a camera lens, the lens holder comprising a mounting flange with opposed upper and lower surfaces and a throughbore extending between the upper and lower surfaces,
the method comprising the steps of:
i) inserting a solder ball into the throughbore through the upper surface of the mounting flange;
ii) aligning the lens holder and circuit board within a plane parallel to the upper surface of the circuit board;
iii) bring the lower surface of the mounting flange and the upper surface of the circuit board together; and
iv) applying laser energy to the solder ball within the throughbore via an optical window at a side of the throughbore to melt the solder ball so that solder at least partially flows out of the throughbore and onto the solder pad,
wherein the throughbore is partially occluded at an occlusion location proximate the lower surface of the mounting flange, such that the throughbore has a larger open area proximate the upper surface of the mounting flange than at the occlusion location.

15. The method of claim 14, wherein step iv) comprises applying laser energy to melt the solder ball.

16. The method of claim 14, wherein step iv) comprises applying thermal energy to the solder ball via a thermal bridge provided proximate the throughbore, the thermal bridge comprising a pathway of relatively high thermal conductivity extending between the throughbore and a surface of the lens holder.

17. The method of claim 14, wherein step iii) is performed before step ii).

* * * * *